(12) United States Patent
Lee et al.

(10) Patent No.: US 10,239,242 B2
(45) Date of Patent: Mar. 26, 2019

(54) METHOD OF MANUFACTURING EMERGENCY LAMP SWITCH

(71) Applicants: Hyundai Motor Company, Seoul (KR); Kia Motors Corporation, Seoul (KR)

(72) Inventors: Young Ju Lee, Gyeonggi-do (KR); Keon Soo Jin, Ulsan (KR); Dae Ig Jung, Gyeonggi-Do (KR); Kwan Woo Lee, Gyeonggi-do (KR); Hye Kyung Kim, Gyeonggi-do (KR)

(73) Assignees: Hyundai Motor Company, Seoul (KR); Kia Motor Corporation, Seoul (KR)

(*) Notice: Subject to any disclaimer, the term of this patent is extended or adjusted under 35 U.S.C. 154(b) by 222 days.

(21) Appl. No.: 15/289,693

(22) Filed: Oct. 10, 2016

(65) Prior Publication Data
US 2017/0312956 A1    Nov. 2, 2017

(30) Foreign Application Priority Data

Apr. 29, 2016  (KR) ........................ 10-2016-0052853

(51) Int. Cl.
| | |
|---|---|
| *B29C 45/14* | (2006.01) |
| *H01H 9/18* | (2006.01) |
| *B41F 17/24* | (2006.01) |
| *B29L 31/30* | (2006.01) |
| *B29L 31/46* | (2006.01) |

(52) U.S. Cl.
CPC .. *B29C 45/14467* (2013.01); *B29C 45/14688* (2013.01); *B29C 45/14827* (2013.01); *B41F 17/24* (2013.01); *H01H 9/182* (2013.01); *B29C 2045/14704* (2013.01); *B29L 2031/30* (2013.01); *B29L 2031/46* (2013.01); *H01H 2219/028* (2013.01)

(58) Field of Classification Search
CPC ........ B29C 45/14827; H01H 2219/028; H01H 9/182
See application file for complete search history.

(56) References Cited

U.S. PATENT DOCUMENTS

| | | | | |
|---|---|---|---|---|
| 6,156,411 | A * | 12/2000 | Jennings | ........... B29C 45/14827 156/242 |
| 8,192,837 | B2 * | 6/2012 | Wang | ........................ C09J 7/10 428/327 |
| 2003/0108720 | A1 * | 6/2003 | Kashino | ................. H01H 13/14 428/189 |

(Continued)

FOREIGN PATENT DOCUMENTS

| | | | | |
|---|---|---|---|---|
| DE | 10312250 | B3 * | 8/2004 | ....... B29C 45/14467 |
| DE | 102006019030 | A1 * | 5/2007 | ............. H01H 9/182 |
| JP | H09183137 | A | 7/1997 | |

(Continued)

*Primary Examiner* — Robert B Davis
(74) *Attorney, Agent, or Firm* — Mintz Levin Cohn Ferris Glovsky and Popeo, P.C.; Peter F. Corless

(57) ABSTRACT

A method of manufacturing an emergency lamp switch is provided. The method includes printing a symbol on a film using inks of a plurality of colors and injection-molding an emergency lamp switch body on a symbol print surface of the film. The symbol print surface is transferred to the emergency lamp switch body and the film from the emergency lamp switch body is removed.

8 Claims, 10 Drawing Sheets

(56) References Cited

U.S. PATENT DOCUMENTS

2005/0163940 A1* 7/2005 Liang .................... B29C 43/021
428/1.1
2015/0356895 A1* 12/2015 Boppart .............. G09F 13/0404
362/511

FOREIGN PATENT DOCUMENTS

| JP | 2000-057871 A | 2/2000 |
| JP | 2001-057125 A | 2/2001 |
| JP | 2013-184300 A | 9/2013 |
| KR | 1995-0008160 A | 4/1995 |
| KR | 2005-0095233 A | 9/2005 |
| KR | 2008-0048630 A | 6/2008 |
| KR | 10-1102924 B1 | 1/2012 |

* cited by examiner

METHOD OF MANUFACTURING EMERGENCY LAMP SWITCH

CROSS-REFERENCE TO RELATED APPLICATION

This application claims under 35 U.S.C. § 119(a) the benefit of priority to Korean Patent Application No. 10-2016-0052853 filed on Apr. 29, 2016, the entire contents of which are incorporated herein by reference.

BACKGROUND

(a) Technical Field

The present disclosure relates to a method of manufacturing an emergency lamp switch and more particularly, to an emergency lamp switch that improves symbol recognition in the emergency lamp switch.

(b) Background Art

Generally, an emergency lamp switch informs surrounding vehicles of an emergency by simultaneously flickering turn signal lamps at the left and right side of a vehicle or informs rear vehicles of an emergency stop through the driver's operation. An emergency lamp switch should be turned on in an emergency and thus requires driver's rapid operation. Therefore, the emergency lamp switch requires visibility to enable a driver to accurately detect the position of the emergency lamp switch to rapidly operate the emergency lamp switch.

Typically the emergency lamp switch provides better in visibility in the daytime but, during low light conditions, the emergency lamp switch is turned on, light from a light source is projected onto a symbol portion in red and white and thus blurring of the symbol portion may occur and recognizability of a symbol shape may be reduced. In other words, a process of manufacturing the emergency lamp switch sequentially includes injection molding, painting three times (e.g., red painting, black painting and high-gloss painting), laser-cutting, and printing a symbol. For example, light from a light source penetrates a red painted region but should not penetrate a symbol printed area. However, light substantially penetrates a white region of the symbol printed area and the symbol recognition of the emergency lamp switch may be compromised.

SUMMARY

The present invention provides a method of manufacturing an emergency lamp switch with a symbol printed on a film to provide a structure and color using a plurality of inks and the printed symbol may be transferred to the emergency lamp switch through injection molding to improve symbol recognition of the emergency lamp switch.

In one aspect, the present invention provides a method of manufacturing an emergency lamp switch that may include printing a symbol on a film using inks of a plurality of colors, injection-molding an emergency lamp switch body on a symbol print surface of the film to transfer the symbol print surface to the emergency lamp switch body and removing the film from the emergency lamp switch body.

In an exemplary embodiment, the printing of the symbol on the film may include printing a first ink of black color (e.g., or the like such as any dark color) that corresponds to the background color of the emergency lamp switch on the symbol print surface except for a symbol area, printing a second ink of white color (e.g., or the like) for displaying the symbol on the symbol area to form a symbol shape, printing a third ink on the back side (e.g. alternate side) of a second ink printed surface and printing a fourth ink of red color (e.g., or the like) for displaying the symbol on the entirety of the symbol print surface that may include the symbol area.

In another exemplary embodiment, the printing of the third ink may include the third ink printed to width less than the printing width of the second ink. Further, the printing of the third ink may include ink of black color (e.g., or the like such as any dark color) printed as the third ink to prevent light emitted from a light source from penetrating the second ink. The printing of the symbol on the film may include applying a coating material disposed between the film and the symbol print surface.

In some exemplary embodiment, the printing of the symbol on the film may include printing a first ink of white color (e.g., or the like such as any light color) to display the symbol on the symbol print surface to form a symbol shape. A second ink of black color may be printed on the back side of a first ink printed surface to prevent transmission of light. In an exemplary embodiment, the injection-molding of the emergency lamp switch body on the symbol print surface of the film may include that the symbol print surface may be transferred to the emergency lamp switch body having a red color (e.g., or the like such as any similar color). In another exemplary embodiment, the printing of the second ink may be printed to a printing width less than the printing width of the first ink.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
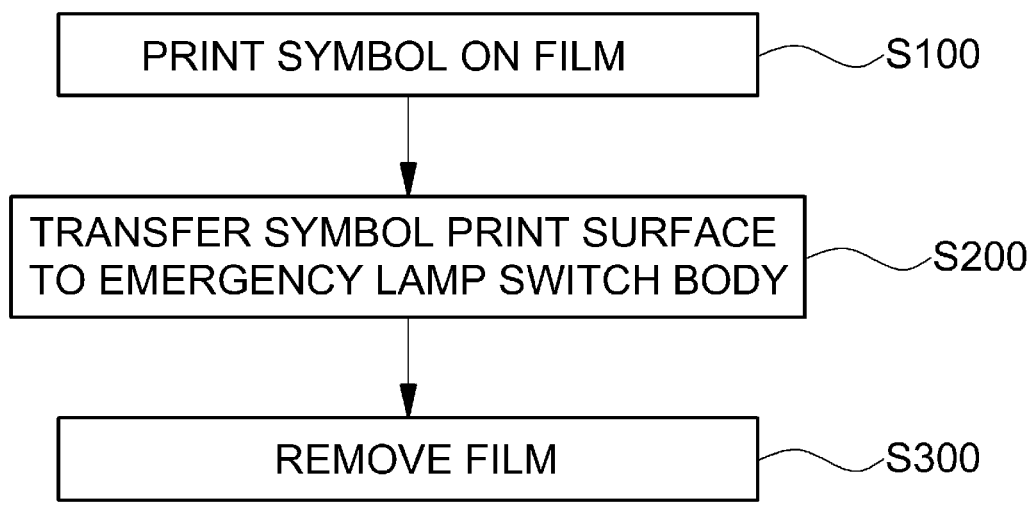
FIG. 1 is an exemplary flowchart sequentially showing a method of manufacturing an emergency lamp switch in accordance with an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. The advantages and features of the present invention and a method for achieving the same will be more clearly understood from the following embodiments with reference to the accompanying drawings. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims. Further, in the following description of the present invention, a detailed description of known functions and configurations incorporated herein will be omitted when it may make the subject matter of the present invention rather unclear.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

FIG. 1 is an exemplary flowchart sequentially showing a method of manufacturing an emergency lamp switch in accordance with an exemplary embodiment of the present invention. FIGS. 2A-2D are exemplary views illustrating a process of the method of manufacturing an emergency lamp switch in accordance with an exemplary embodiment of the present invention. As exemplarily shown in FIG. 1, a method of manufacturing an emergency lamp switch in accordance with an exemplary embodiment of the present invention will be described below.

A symbol may be printed on a film 10 using inks having a plurality of colors (Operation S100). For example, as exemplarily shown in FIG. 2A, an emergency lamp symbol may be printed on the film 10 and a detailed description of printing a symbol will be described later. Thereafter, an emergency lamp switch body 1 may be injection-molded on a symbol print surface 12 of the film 10, as exemplarily shown in FIG. 2C. The symbol print surface 12 may be transferred to the emergency lamp switch body 1 (Operation S200).

Figure 2A:
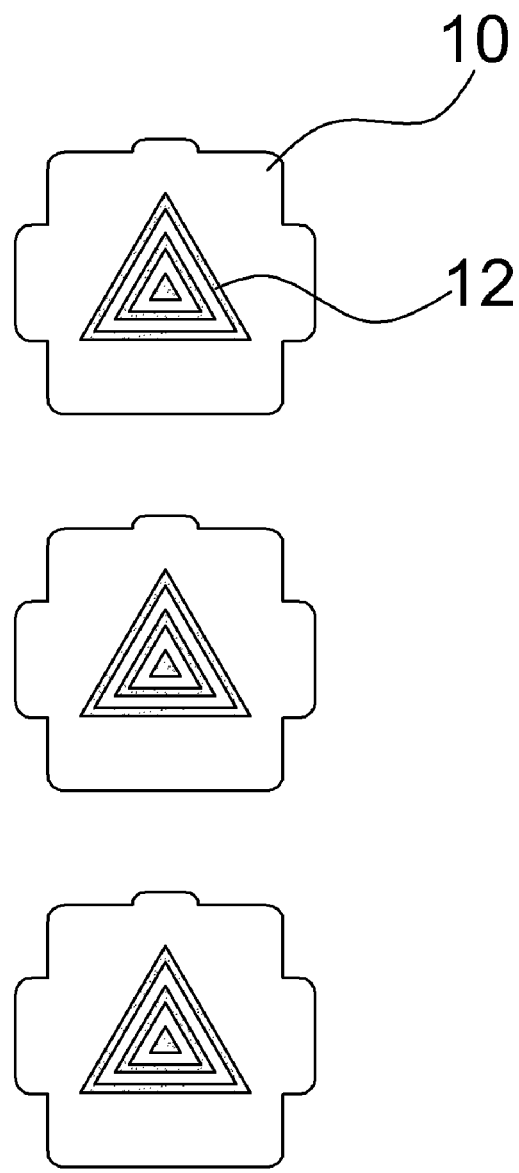
FIGS. 2A-2D are views illustrating a process of the method of manufacturing an emergency lamp switch in accordance with an exemplary embodiment of the present invention.
Figure 2B:
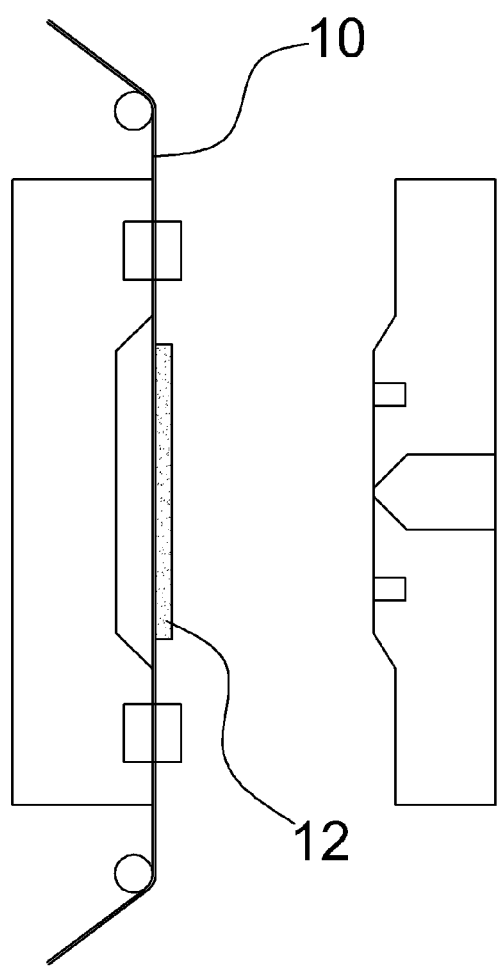
Figure 2C:
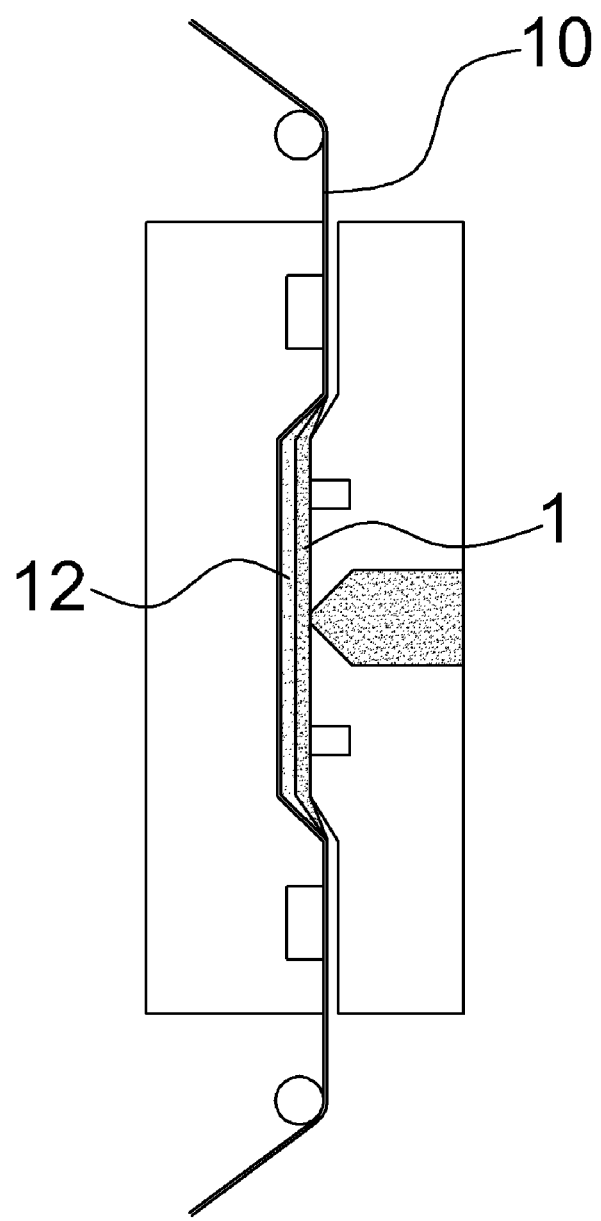
Figure 2D:
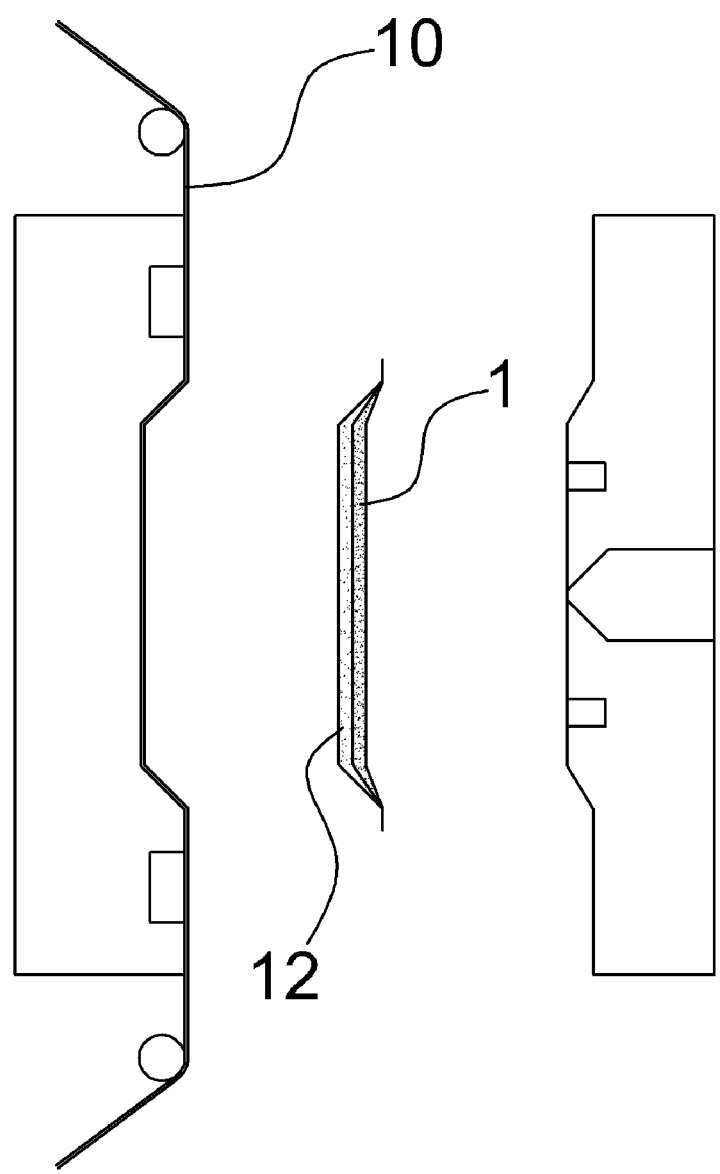

In particular, as exemplarily shown in FIG. 2B, when the film 10 printed with the symbol is seated on a mold and the film 10 is molded by another mold, the emergency lamp switch body 1 may be injection-molded by injecting a plastic resin onto the symbol print surface 12. Then the symbol may be transferred to the emergency lamp switch body 1 through molding. Thereafter, the film 10 may be removed from the emergency lamp switch body 1 (Operation S300). As shown in FIG. 2D, the manufacture of a final product is completed.

Conventionally, to manufacture an emergency lamp switch, after an emergency lamp switch body having a white color is formed by injection molding, red painting, black painting and high-gloss painting are sequentially executed on the emergency lamp switch body. Then laser-cutting and symbol printing are performed thereby completing a final product. However, when the final product is completed, the repetition of painting and drying increases the product manufacturing cycle and manufacturing costs and a defect rate are also increased. Therefore, in the exemplary embodiment, instead of three paintings, laser-cutting and symbol printing after injection molding, the symbol may be printed on the film 10 and may be transferred to the emergency lamp switch body 1 and symbols may be printed in increased quantities to improve productivity.

Figure 3:
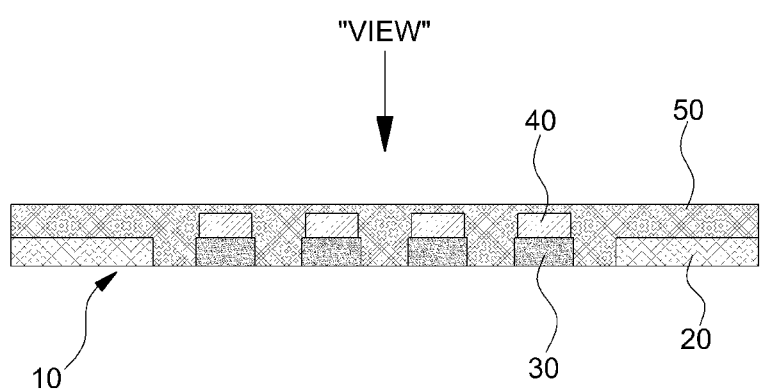
FIG. 3 is an exemplary view illustrating a symbol print surface in the method of manufacturing an emergency lamp switch in accordance with an exemplary embodiment of the present invention.
Figure 4A:
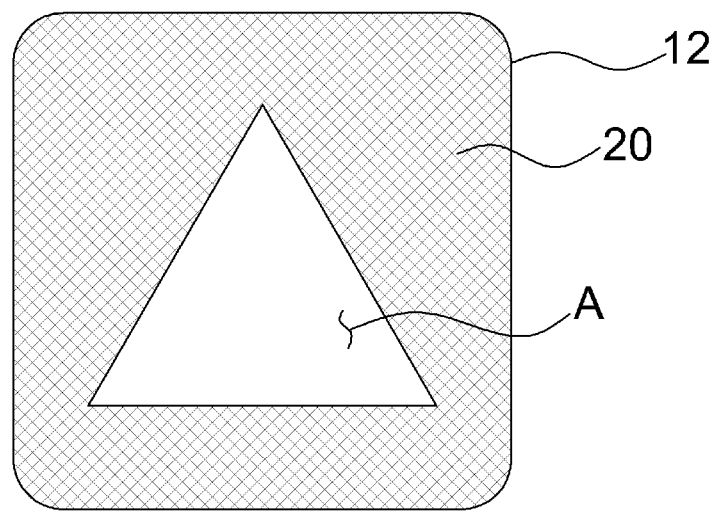
FIGS. 4A-4D are exemplary views sequentially illustrating a process of printing a symbol, viewed in the direction of an arrow of FIG. 3, in the method of manufacturing an emergency lamp switch in accordance with an exemplary embodiment of the present invention.
Figure 4B:
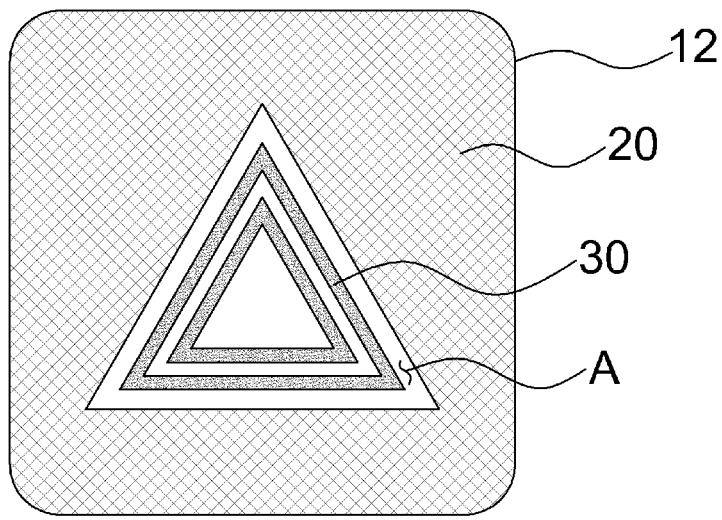
Figure 4C:
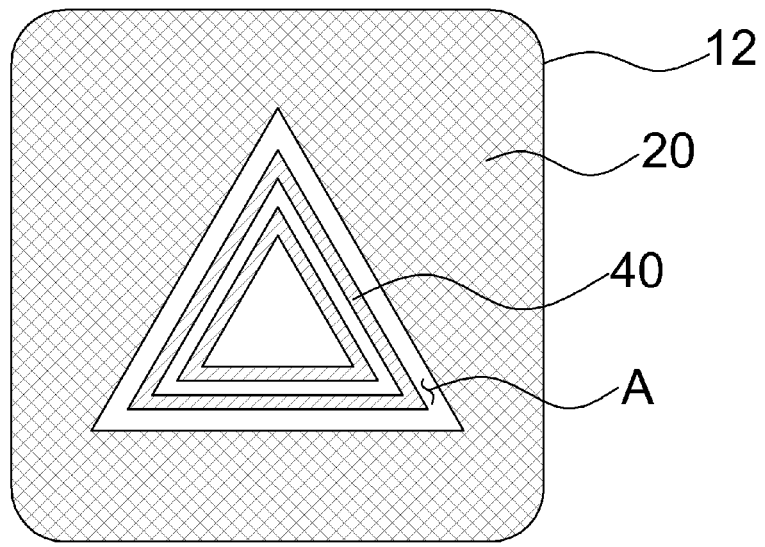
Figure 4D:
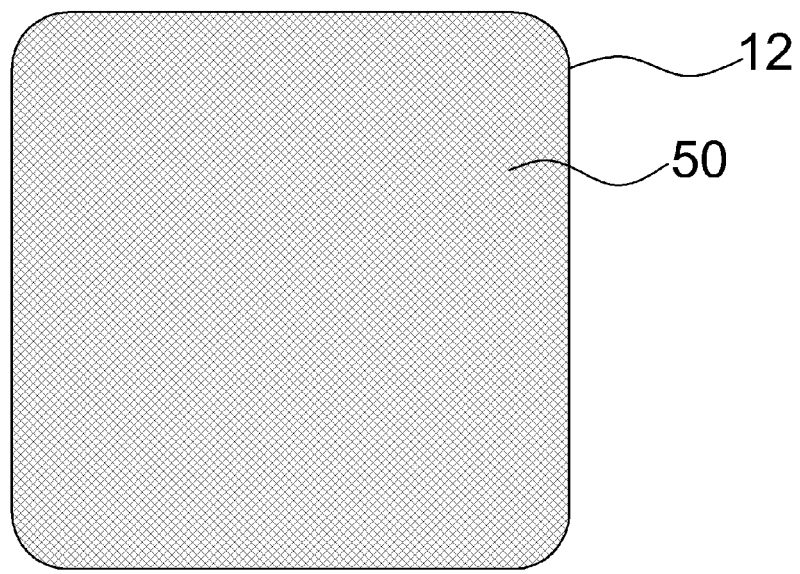
Figure 5:
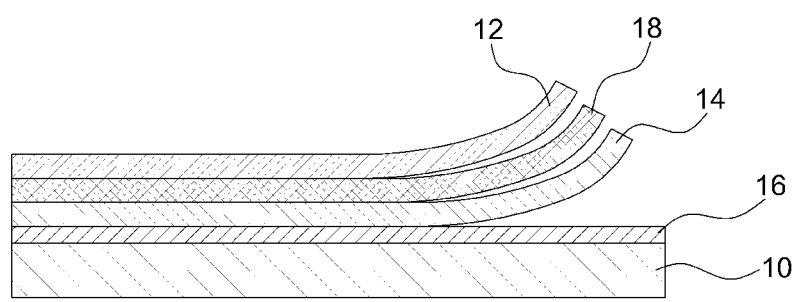
FIG. 5 is an exemplary view illustrating the structure of the symbol print surface on a film in the method of manufacturing an emergency lamp switch in accordance with an exemplary embodiment of the present invention.

FIG. 3 is an exemplary view illustrating a symbol print surface in the method of manufacturing an emergency lamp switch in accordance with an exemplary embodiment of the present invention. FIGS. 4A to 4D are exemplary views sequentially illustrating a process of printing a symbol, viewed in the direction of an arrow of FIG. 3, in the method of manufacturing an emergency lamp switch in accordance with an exemplary embodiment of the present invention. FIG. 5 is an exemplary view illustrating the structure of the symbol print surface on the film in the method of manufacturing an emergency lamp switch in accordance with an exemplary embodiment of the present invention.

As exemplarily shown in FIGS. 4A to 4D, a process of printing the symbol on the film 10 in accordance with an exemplary embodiment will be sequentially described below. First, as exemplarily shown in FIG. 4A, a first ink 20 of black color that corresponds to the background color of the switch may be printed on the symbol print surface 12 except for a symbol area A. Thereafter, as exemplarily shown in FIG. 4B a second ink 30 of white color exerting a symbol display function may be printed on the symbol area A to form a symbol shape of an emergency lamp. Thereafter, as exemplarily shown in FIG. 4C, a third ink 40 may be printed on the back side of the second ink printed surface. Finally, as exemplarily shown in FIG. 4D, a fourth ink 50 of red color may be printed on a substantial portion of the symbol print surface including the symbol area A and then symbol printing may be completed. The fourth ink printed surface may be transferred to the emergency lamp switch body 1 through injection molding.

Through the above-described process, a symbol may be printed on the symbol print surface 12 of the film 10, as exemplarily shown in FIG. 3. For example, a black ink may be printed as the third ink 40 to prevent light emitted from a light source from penetrating the second ink 30 to be exposed to the exterior. The third ink 40 may be printed to a printing width that is less than the printing width of the second ink 30 and may prevent exposure of the third ink 40 to the outside. When the light source within the emergency lamp switch is turned on, the remainder of the symbol area A except for regions that forms a symbol shape may transmit red light to the exterior by the fourth ink 50. The regions, in which the symbol shape is formed through the second ink 30 may be prevented from transmitting light due to the third ink 40 of black color and may not transmit red light to the exterior.

Therefore, an exemplary embodiment, when the light source within the emergency lamp switch is turned on, light emitted from the light source may not penetrate the fourth ink 50 of red color and the second ink 30 and may prevent exposure to the exterior. Accordingly, the symbol recognition of the emergency lamp switch may be improved. Conventionally, light emitted based on turning-on of a light source penetrates both a red painted surface and a white painted surface. In particular, blurring of red color on the white painted surface occurs and symbol recognition is compromised. In the exemplary embodiment, the fourth ink 50 may prevent light emitted from the light source from penetrating the second ink 30 via the third ink 40 and may improve the symbol recognition.

A coating material 14 may be applied between the film 10 and the symbol print surface 12. In particular, as exemplarily shown in FIG. 5, a release agent 16 may be applied to the film 10 formed of polyethylene terephthalate (PET). The coating material 14 used to prevent the surface of the emergency lamp switch from peeling or discoloring may be applied thereto. A primer 18 to improve adhesion between the symbol print surface 12 that the inks are printed on and the coating material 14 may be applied thereto. Accordingly, the film 10 that the emergency lamp symbol is printed on is completed. When the symbol print surface 12 is transferred to the emergency lamp switch body 1 by injection-molding the emergency lamp switch body 1 on the symbol print surface 12 the film 10 and the release agent 16 may be removed from the emergency lamp switch body 1, thereby completing an emergency lamp switch product.

Figure 6:
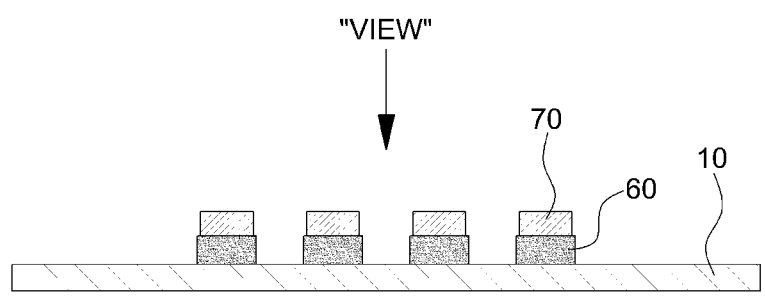
FIG. 6 is an exemplary view illustrating a symbol print surface in a method of manufacturing an emergency lamp switch in accordance with an exemplary embodiment of the present invention.
Figure 7A:
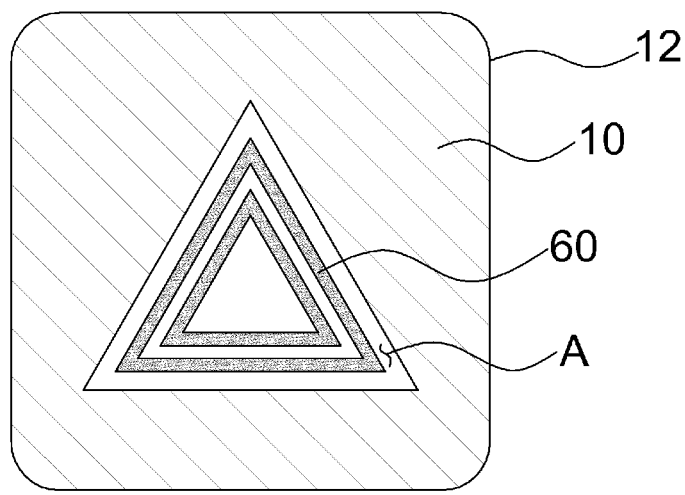
FIGS. 7A-7B are exemplary views sequentially illustrating a process of printing a symbol, viewed in the direction of an arrow of FIG. 6, in the method of manufacturing an emergency lamp switch in accordance with another exemplary embodiment of the present invention.
Figure 7B:
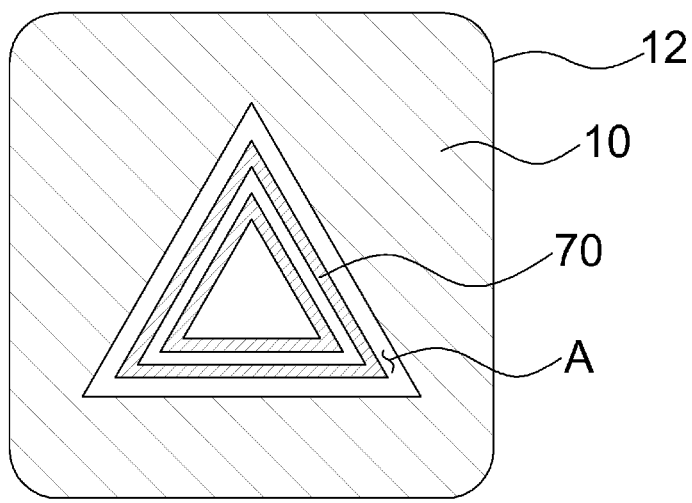

FIG. 6 is an exemplary view illustrating a symbol print surface in a method of manufacturing an emergency lamp switch in accordance with an exemplary embodiment of the present invention and FIGS. 7A and 7B are views sequentially illustrating a process of printing a symbol, viewed in the direction of an arrow of FIG. 6, in the method of manufacturing an emergency lamp switch in accordance with an exemplary embodiment of the present invention.

As exemplarily shown in FIGS. 7A and 7B, a process of printing a symbol on a film 10 in accordance with the exemplary embodiment will be sequentially described below. First, as exemplarily shown in FIG. 7A, a first ink 60 of white color may be printed on a symbol area A provided on a symbol print surface 12 of the film 10 to form a symbol shape. Thereafter, as exemplarily shown in FIG. 7B, a second ink 70 of black color may be printed on the back side of the first ink printed surface. Accordingly, the film 10 printed with a symbol may be provided by sequentially printing the first ink 60 and the second ink 70 of two colors on the symbol print surface 12 of the film 10, as exemplarily shown in FIG. 6. For example, the symbol print surface 12 of the film 10 may have a red color and may be transferred to an injection-molded emergency lamp switch body 1. Accordingly, as described earlier in the former exemplary embodiment, a process of printing a separate red ink may be omitted.

Further, a black ink may be printed as the second ink 70 to prevent light emitted from a light source from penetration of the first ink 60 to prevent exposure to the exterior. The second ink 70 may be printed to a printing width less than the printing width of the first ink 60 to prevent exposure to the exterior. Therefore, in an exemplary embodiment in which the first ink 60 and the second ink 70 of two colors are printed, when the light source within the emergency lamp switch is turned on, light having penetrated the emergency lamp switch body 1 having a red color may be blocked (e.g., obstructed) by the second ink 70. Accordingly, red light may not penetrate the first ink 60 to prevent exposure to the exterior of the first ink 60.

As is apparent from the above description, in a method of manufacturing an emergency lamp switch in accordance with the present invention, a symbol may be printed on a film to provide a structure and color using a plurality of inks. The printed symbol may be transferred to the emergency lamp switch through injection molding and may improve symbol recognition of the emergency lamp switch. Further, in the manufacturing method in accordance with the present invention, the film and a symbol print surface may be separated from each other after injection molding. The separated symbol print surface may be transferred to an injection-molded surface to simplify a manufacturing process of the emergency lamp switch which conventionally includes a plurality of painting processes, a laser-machining process and a printing process.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:
1. A method of manufacturing an emergency lamp switch, comprising:
  printing a symbol on a film using inks of a plurality of colors;

injection-molding a switch body on a symbol print surface of the film to transfer the symbol print surface to the switch body; and removing the film from the switch body, wherein the printing of the symbol on the film includes:
printing a first ink of black color that corresponds to a background color of the switch on the symbol print surface except for a symbol area;
printing a second ink of white color to display the symbol on the symbol area to form a symbol shape;
printing a third ink on the back side of a second ink printed surface; and
printing a fourth ink of red color to display the symbol on the entirety of the symbol print surface including the symbol area.

2. The method of claim 1, wherein the printing of the third ink includes, the third ink printed to a painting width that is less than the printing width of the second ink.

3. The method of claim 1, wherein an ink of black color is printed as the third ink to restrict light emitted from a light source from penetration of the second ink.

4. The method of claim 1, wherein the printing of the symbol on the film includes applying a coating material disposed between the film and the symbol print surface.

5. A method of manufacturing an emergency lamp switch, comprising:
printing a symbol on a film using inks of a plurality of colors;
injection-molding a switch body on a symbol print surface of the film to transfer the symbol print surface to the switch body; and
removing the film from the switch body,
wherein the printing of the symbol on the film includes:
printing a first ink to display the symbol on the symbol print surface to form a symbol shape; and
printing a second ink on the back side of a first ink printed surface to prevent light transmission.

6. The method of claim 5, wherein the injection-molding of the switch body on the symbol print surface of the film includes transferring the symbol print surface to the switch body having red color.

7. The method of claim 5, wherein the printing of the second ink includes the second ink printed to printing width that is less than the printing width of the first ink.

8. The method of claim 5, wherein the first ink is a white color and the second ink is a black color.

* * * * *